US007590233B2

(12) United States Patent
Chiloyan

(10) Patent No.: US 7,590,233 B2
(45) Date of Patent: Sep. 15, 2009

(54) USER CONFIGURABLE HEADSET FOR MONAURAL AND BINAURAL MODES

(75) Inventor: John H. Chiloyan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 11/313,824

(22) Filed: Dec. 22, 2005

(65) Prior Publication Data

US 2007/0147629 A1 Jun. 28, 2007

(51) Int. Cl.
*H04M 1/00* (2006.01)
*H04R 25/00* (2006.01)

(52) U.S. Cl. ....................................... 379/430; 381/370

(58) Field of Classification Search ................. 379/430; 381/370, 374, 376–379, 381, 384, 330; 455/569.1
See application file for complete search history.

(56) References Cited

U.S. PATENT DOCUMENTS 6,374,126 B1 4/2002 MacDonald
2003/0073460 A1* 4/2003 van Pelt et al. .............. 455/556
2003/0104842 A1* 6/2003 Choi et al. .................. 455/569
2005/0100182 A1* 5/2005 Sykes et al. ................. 381/315
2005/0277446 A1* 12/2005 Yueh ....................... 455/569.1
2008/0107294 A1* 5/2008 Burrows et al. ............. 381/312

OTHER PUBLICATIONS

Non-Final Office Action in U.S. Appl. No. 11/313,825 mailed May 13, 2009.

* cited by examiner

*Primary Examiner*—Tuan D Nguyen
(74) *Attorney, Agent, or Firm*—Merchant & Gould P.C.

(57) ABSTRACT

A headset is described that can be user-configured to be used in either monaural or binaural modes. The headset may include a first speaker for one ear, and a second speaker in an earpiece inserted in the headset body. The earpiece may be retractable, and upon removal from the headset, the headset may switch from monaural to binaural mode. The earpiece may communicate wirelessly with the headset, or may be coupled using a spring-loaded or manually retractable wire. The headset may wirelessly detect the addition of a second headset, and may switch to binaural mode based on this addition.

17 Claims, 9 Drawing Sheets

USER CONFIGURABLE HEADSET FOR MONAURAL AND BINAURAL MODES

BACKGROUND

Cellular telephones and other portable electronic devices have become ubiquitous in today's world. It is not uncommon today for an individual to have a cell phone, a portable music player (such as an MP3 player), a personal data/digital assistant (PDA), and portable gaming device all jumbling about in a purse or pocket. The sheer volume of these portable devices actually works against their portability, as there are only so many things a user will want to carry with them.

To help alleviate the burden of carrying these devices around, manufacturers are beginning to consolidate more and more functionality. So it is now possible to have a cell phone that also doubles as a portable media player, PDA, or game device. The audio capabilities of such devices, however, have not been so readily combined.

For example, while many cell phones are compatible with earpieces, such as those having an in-line microphone bud, these earpieces are monaural (e.g., heard by one ear), and do not provide the binaural quality and fidelity that some users prefer for listening to music. Some cell phones are compatible with traditional stereo headphones, but many users may be uncomfortable using such headphones for cell phone calls. For example, a user might be on a business call at the office, and may not wish to give the appearance that they are listening to music, considered by most to be a recreational activity. Such a user could carry around an earpiece for phone calls and a set of traditional headphones for listening to music, but that is cumbersome.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one aspect of the features described herein, an audio headset may be provided for monaural use, such as a cell phone call, and may be expandable for binaural use. A second earpiece may be removably attached to the headset during monaural use, and pulled from the headset and inserted in the user's other ear for binaural use. In some aspects, the additional earpiece may be located within a compartment of the headset, and may be communicatively coupled to the headset via a wire or wireless connection. In some aspects, the headpiece may include interfaces, such as headphone jacks, to allow the insertion of one or more additional earpieces.

In some aspects, the removable earpiece and headset may include additional functionality when operating in stereo mode. For example, stereo signal controls on the headset may be revealed upon the removal of the earpiece, or exposed on the earpiece. The headpiece may include circuitry to detect the removal of the earpiece, and may automatically revert to stereo mode when the earpiece is removed.

In some aspects, the second earpiece may wirelessly communicate with the headset and/or the user's cell phone, and may include circuitry to duplicate the functionality of the headset. The headset may be configured to wirelessly communicate with a first earpiece, such as the headset, during monaural use, and may dynamically add a second earpiece to the wireless communication when stereo communication is desired. Additional earpieces may be used to provide additional audio channels for the user.

These and other features will be addressed in greater detail below.

DETAILED DESCRIPTION

In the following description of the various aspects, reference is made to the accompanying drawings, which form a part hereof, and in which is shown by way of illustration various features described herein may be practiced. It is to be understood that other embodiments may be used and structural and functional modifications may be made.

Figure 1:
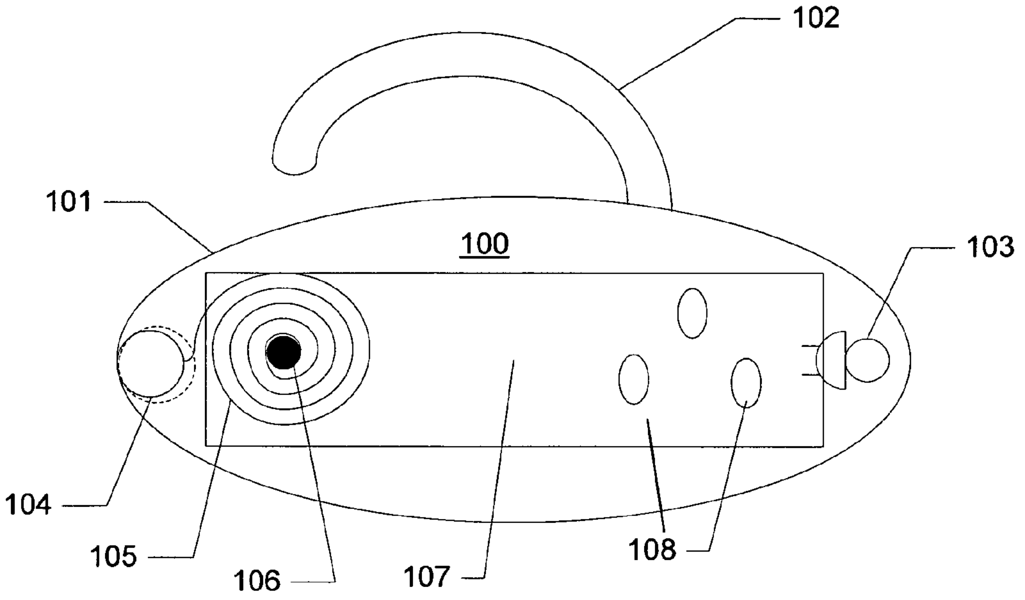
FIG. 1 illustrates an example headset incorporating various features described herein.

FIG. 1 illustrates an example headset that can be user configured for monaural or binaural use. As shown, headset 100 may include a body portion 101, which may be oval, rectangular, or of any desired shape suitable for encasing the components described herein. Headset 100 may include an ear clasp 102 to allow the headset 100 to be worn on a user's ear. Clasp 102 may be of any desired configuration, and may include additional structure, such as a head wire, plastic support, neck loop, etc., to reach around or over a user's head and hold the headset 100 in position over one of the user's ears.

Headset 100 may include one or more microphones 103 to detect sounds. Microphone 103 may be a conventional microphone, or a directional microphone focused on an area where the user's mouth is likely to be in use (e.g., an area below the headset). Multiple microphone elements may be included to perform noise cancellation (e.g., by detecting sound emanating from other directions, and canceling those sounds out).

Headset 100 may also include a primary speaker element (not shown) to direct one audio channel of sound towards the user's ear when the headset is in position. For example, the primary speaker element may be located on an opposite side from that shown in FIG. 1. Such a primary speaker may be of any type used for portable devices, such as cell phones or media players.

Headset 100 may also include a secondary earpiece 104, which may be a speaker designed for use in or with a person's ear, such as an earbud-type earpiece. The secondary earpiece 104 may be another speaker element that is inserted into a recessed portion of headset body 101. The earpiece 104 may be partially or completely inserted into the recess. For example, the earpiece 104 may be partially inserted into the recess and follow a contour of the body 101. Alternatively, the earpiece may be completely inserted into the recess such that the earpiece is enveloped by the body 101.

The earpiece may be held in place in headset body 101 in a variety of ways. For example, the earpiece 104 and body 101 recess may include mating ridges, with the earpiece 104 "snapped" into and out of place. Alternatively, earpiece 104 may be held in place by a friction mating surface, such as a rubberized edge and a rubberized interior surface to the recess. Alternatively, the earpiece may be held in place via a spring-loaded latch, such as that used with SD memory cards, floppy disk drives, and such, wherein the earpiece 104 is snapped into place by pressing it into the recess, and released by pressing it into the recess again.

The earpiece 104 may also be held in place by its communication wire 105. Wire 105 provides electrical signals to the earpiece 104 when in use, and may be coiled within headset by a spring-loaded roller 106. The wire may be of any type suitable for headphone use. If desired, the wire may be a flat ribbon wire, which may be more suitable for ease in coiling. Other transmission technologies may be used as well, such as wireless, analog transmissions through bone, etc.

The roller 106 may operate like a tape measure or window blind, and may wind up excess slack in wire 105 in an internal cavity within the body 101. Similarly, the roller 106 may lock into position when the wire 105 is extended a predetermined length, and may be retractable by temporarily pulling on the wire 105, or by pressing a switch (mechanical or electrical) on the headset body 101. The force exerted by the roller 106 may help hold the earpiece 104 in, or against, the body 101 recess. As alternatives, the roller may be manually wound, or wound by a motor.

The headset 100 may also include a circuit element 107, such as a printed circuit board, containing the electrical components needed to operate the unit. These components are discussed in greater detail with respect to FIG. 11 below. As inputs to the electrical components, the headset 100 may include one or more buttons 108. Buttons 108 may allow the user to control a variety of aspects of the headpiece, such as sound volume, stereo/mono format, on/off, synchronization/mating with a host device, etc.

Figure 2:
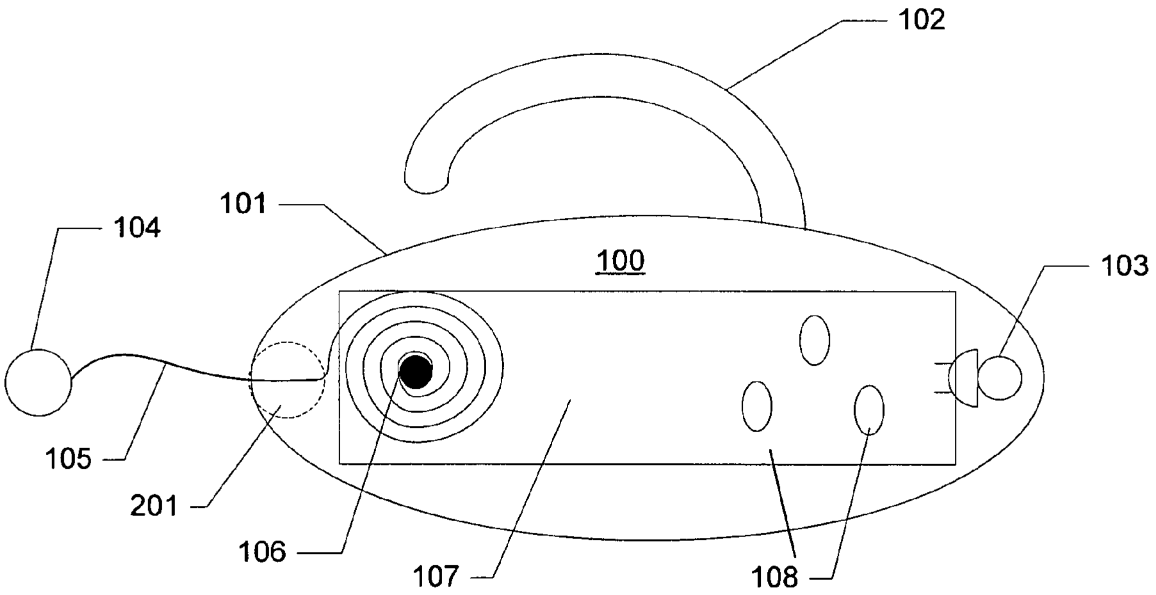
FIG. 2 illustrates the FIG. 1 headset, with an earpiece extended away for stereo use.
Figure 3:
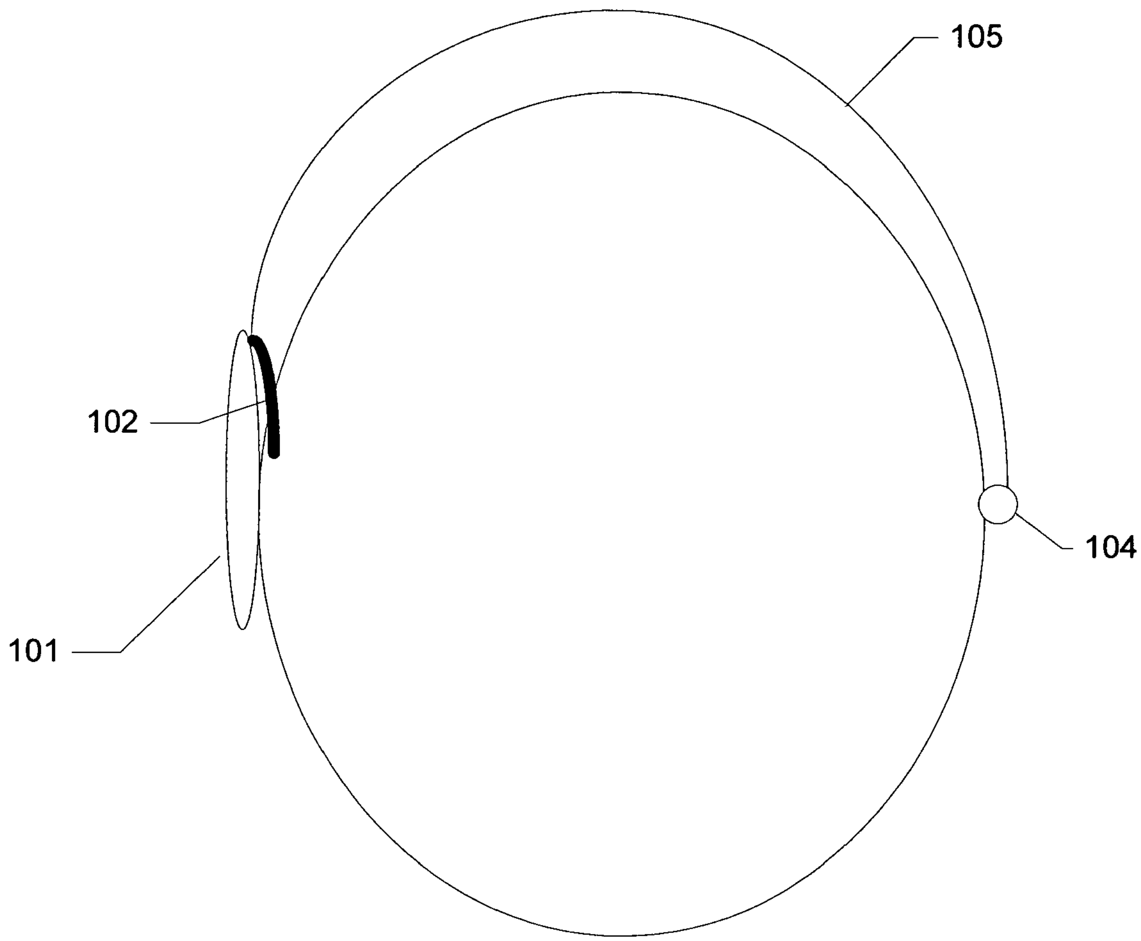
FIG. 3 illustrates an example configuration of using the FIG. 1 and FIG. 2 headset.

As shown in FIG. 2, the earpiece 104 may be pulled away from headset 100 by, for example, pressing in on the earpiece to release the spring-loaded latch and pulling on the earpiece 104. Subsequently, and as shown in FIG. 3, the earpiece 104 may be pulled around to the user's other ear, and inserted therein for use in a stereo mode. If the headset 100 is configured with a head wire (e.g., a rigid or semi-rigid structure extending around a user's head to hold the headset 100 in place), the earpiece 104 may be attached to an opposite end of that structure. Furthermore, if a head wire is used, wire 105 may be run along the head wire. For example, the head wire may include a groove into which the wire 105 may be inserted. Of course, if the user is wishing to be discreet about listening to music, the head wire may be avoided, and the wire 105 may be run around the back of the head, or along a shirt collar, etc.

Figure 4:
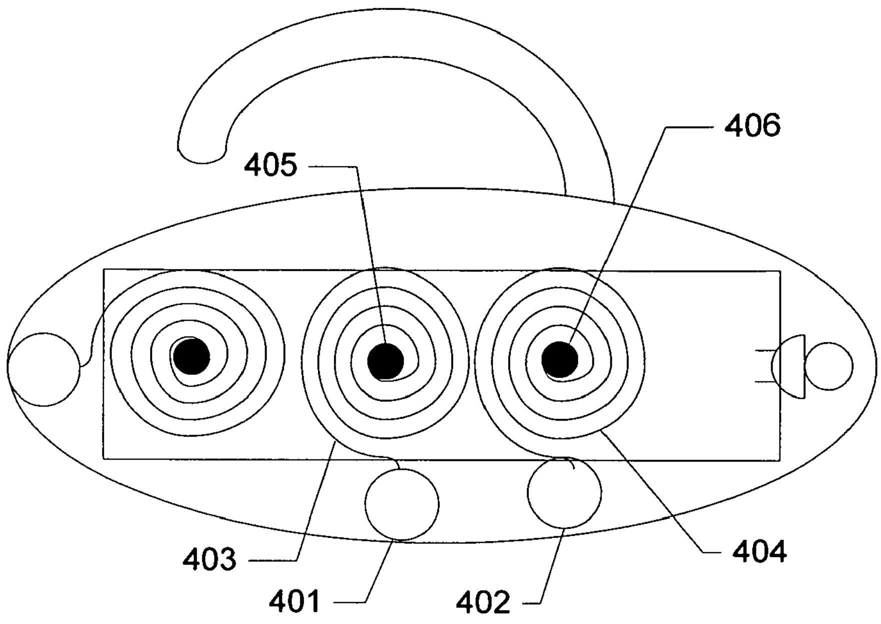
FIG. 4 illustrates a headset having multiple internal earpieces.

With the earpiece 104 extended, the headset 100 may be converted from a monaural mode to a binaural mode. Binaural mode is not the limit, however. Additional audio channels may be supported by having additional earpieces. For example, as shown in FIG. 4, any number of additional earpieces 401, 402 may be included, with wires 403, 404 and spring rollers 405, 406, depending on the designer's preference. Any number of additional audio channels may be supported to provide the user with binaural modes.

Figure 5:
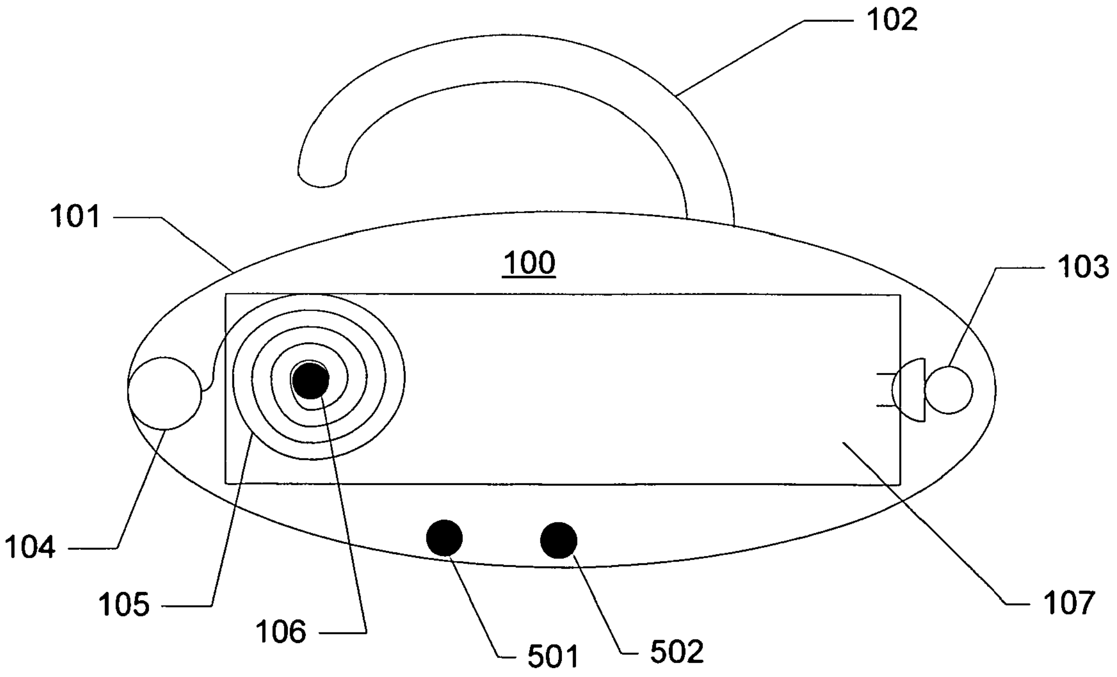
FIG. 5 illustrates a headset having communication interfaces, such as headphone jacks, for accepting additional earpieces.

As shown in FIG. 5, the headset 100 may include one or more headphone interfaces 501, 502 to support additional earpieces. Headphone interfaces 501, 502 may be of any type compatible with headphone earpieces, such as a headphone jack (e.g., ¼", ⅛", 2.5 mm, etc.), USB port, or any other interface. If desired, earpiece 104 may also connect to a headphone interface, and wire 105 and roller 106 may be avoided if the earpiece is intended to be carried separately and plugged in when the user wants stereo use.

Figure 6:
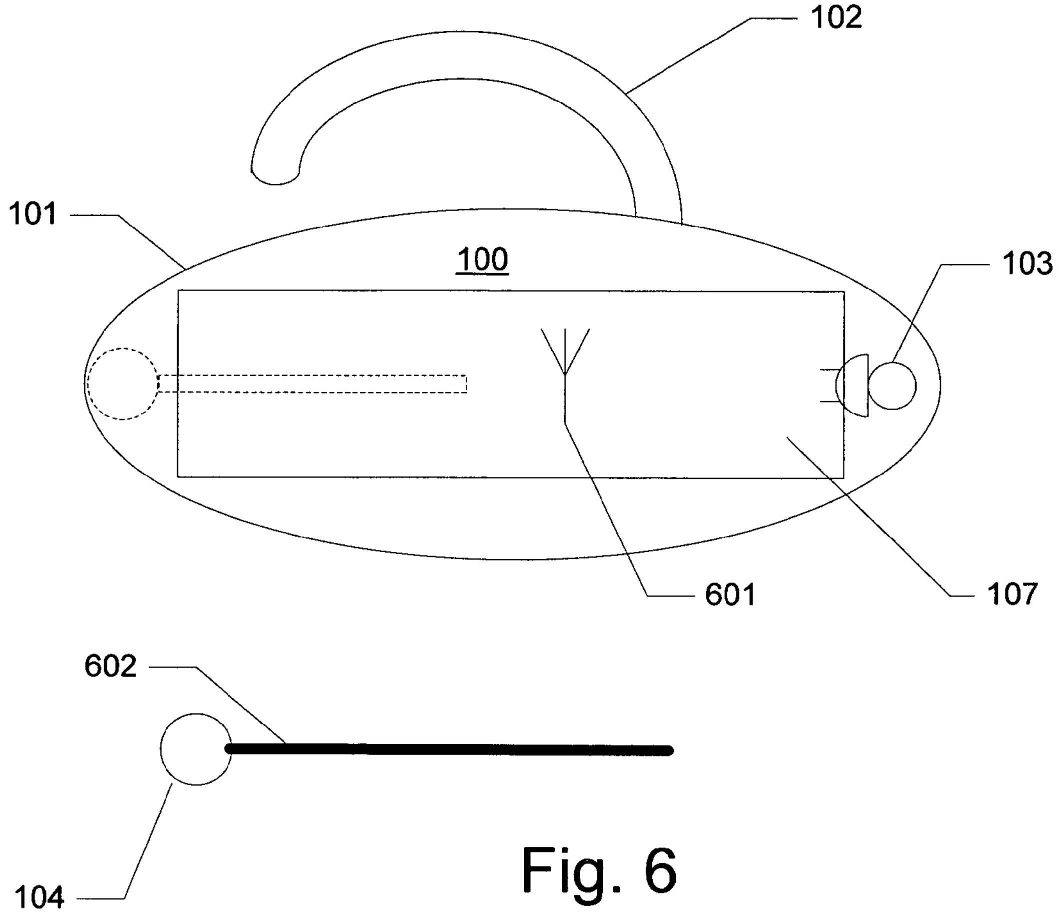
FIG. 6 illustrates a headset having a removable earpiece, a portion of which also serves as a stylus.

As noted above, earpiece 104 may communicate in a variety of ways. FIG. 6 illustrates an example headset 100 having a removable earpiece that uses wireless transmission to communicate with the headset 100. Headset 100 may include an antenna 601 for such transmission, and the earpiece may also include an antenna 602. If the headset 100 is intended to operate with a touch sensitive device, antenna 602 may take the form of and/or act as a rigid stylus.

The headset 100 may be configured to automatically detect when the user removes the earpiece 104 for stereo mode. For example, the earpiece may open (or close) a switch in the headset body 101 when the earpiece is in place. The recess in the headset body 101 may include exposed contacts that are closed by a conductive portion of the earpiece 104, or a mechanical switch depressed by the earpiece 104.

Figure 7:
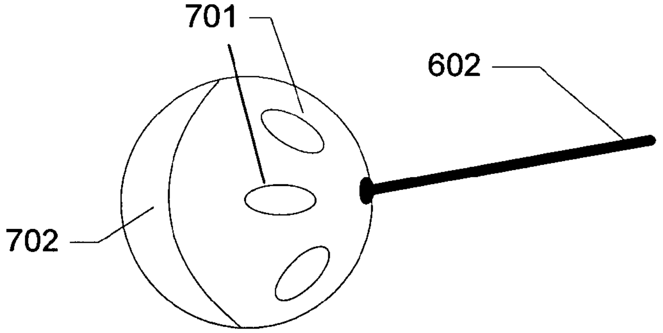
FIG. 7 is a close-up view of an earpiece.

Removal of the earpiece 104 may expose additional controls that are useful for stereo mode. As shown in FIG. 7, the earpiece may include one or more buttons 701 that are exposed when the earpiece is removed from the headset body 101. These buttons 701 may be useful for any desired function, and may be particularly useful for functions that are relevant to stereo mode. For example, a button 701 may be used to control left/right audio balance (or other audio tuning functions), earpiece volume, or may wirelessly connect or synchronize an earpiece 104 with a local headset 100 or other wireless device. A button 701 may also be used to indicate whether the earpiece 104 is still in the headset body 101, or when it is removed. The earpiece may also include a speaker portion 702, opposite the buttons, which may provide the sound to the user's ear.

The shape of the earpiece may be modified as needed to implement the features described herein. For example, the earpiece in FIG. 7 is shown as a spherical shape, but a different shape (e.g., larger, more rectangular, etc.) may be used to accommodate additional circuitry, larger batteries, different ear type or use configuration, etc. Additionally, and as described below, earpiece 104 may be replaced by another headset 100, if desired.

Figure 8:
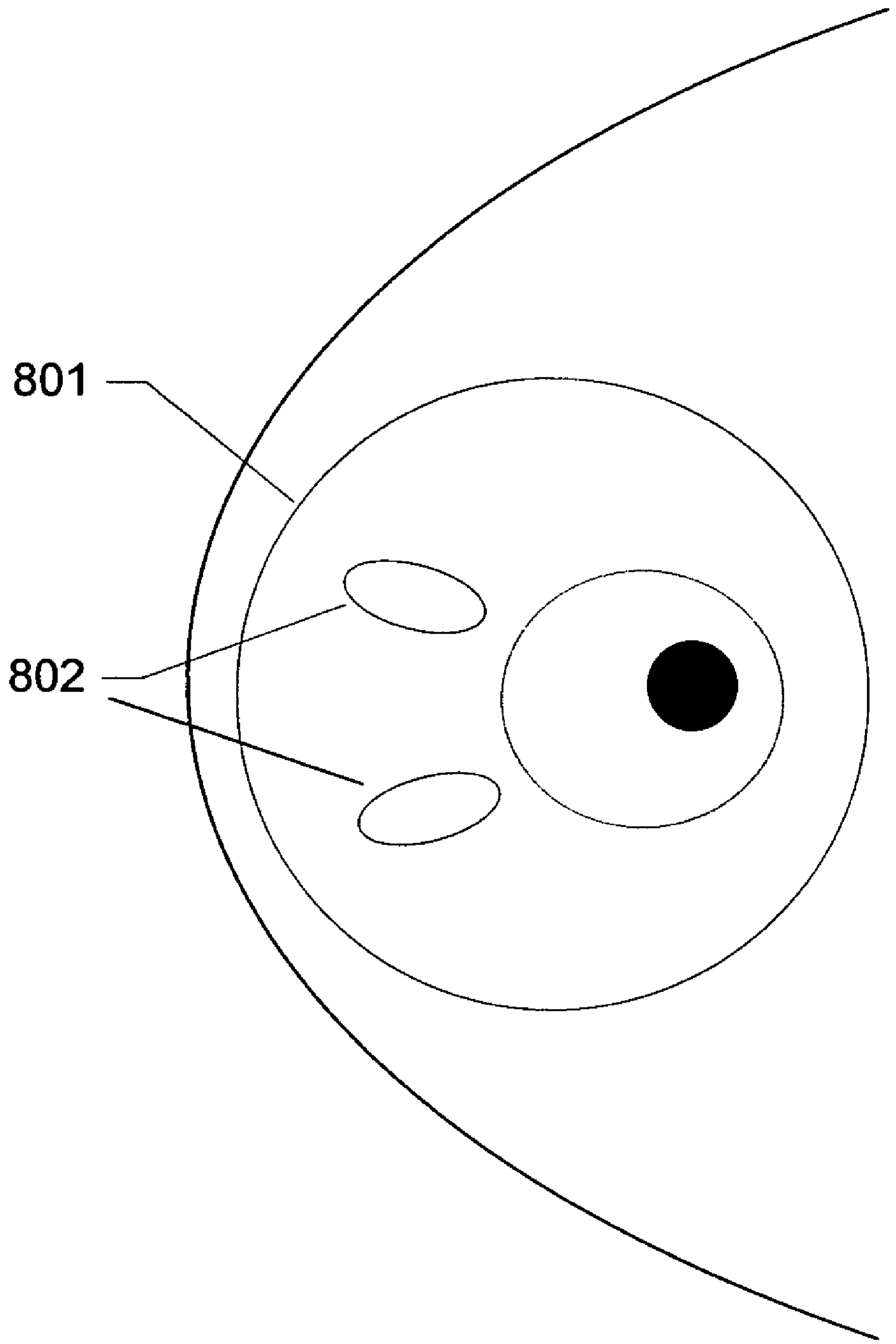
FIG. 8 is a close-up view of a headset having an earpiece removed.

Removal of earpiece 104 may also expose additional controls on the headset. FIG. 8 shows an example close-up view of a portion of headset 100, with recess 801, and additional buttons 802 exposed by the removal of earpiece 104. Buttons 802 may be used in a similar manner as buttons 701, including functions that are more pertinent when in stereo mode.

Figure 9:
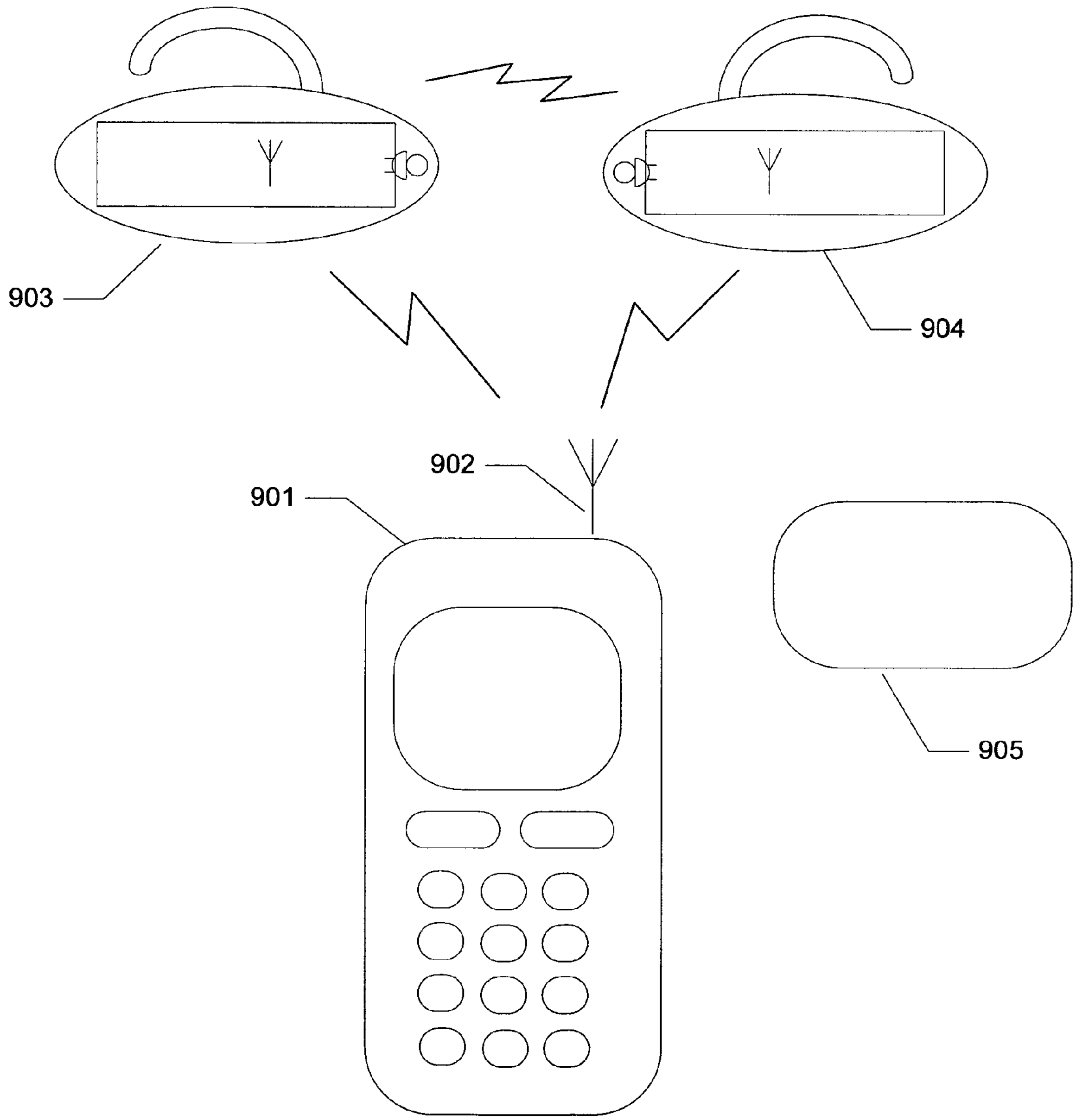
FIG. 9 illustrates a communications environment in which one or more headsets may be used.

FIG. 9 illustrates an example use for headset 100. Headset 100 may be used with any type of audio device, such as a personal computer, personal data assistant (PDA), music player, video player, cell phone, game device, etc. FIG. 9 depicts an example of a cellular phone 901, but the description herein is equally applicable to other types of audio devices. Phone 901 may include an antenna 902 for a wireless communication link between the phone 901 and a headset 903 during monaural use, and which may communicate with a second headset 904 for binaural use. Second headset 904 may be the earpiece described above, or it may be a completely separate, duplicate version of earpiece 903. Headsets 903, 904 may each wirelessly communicate with phone 901 to obtain necessary data and signals for separate audio channels. Alternatively, one headset (e.g., 904) may obtain its data and signals from the other headset 903 (as the case may also be if headset 904 were replaced by an earpiece 104 taken from headset 903).

When two headsets 903, 904 are used in a telephone call, the microphones on each headset may be used as dual directional microphones, to help reduce noise encountered in a telephone call. Headsets 903, 904 and/or phone 901 may focus on the audio signals that are received by both microphones, and ignore other signals as noise. FIG. 9 also depicts another device 905, which will be described in greater detail below.

Figure 10:
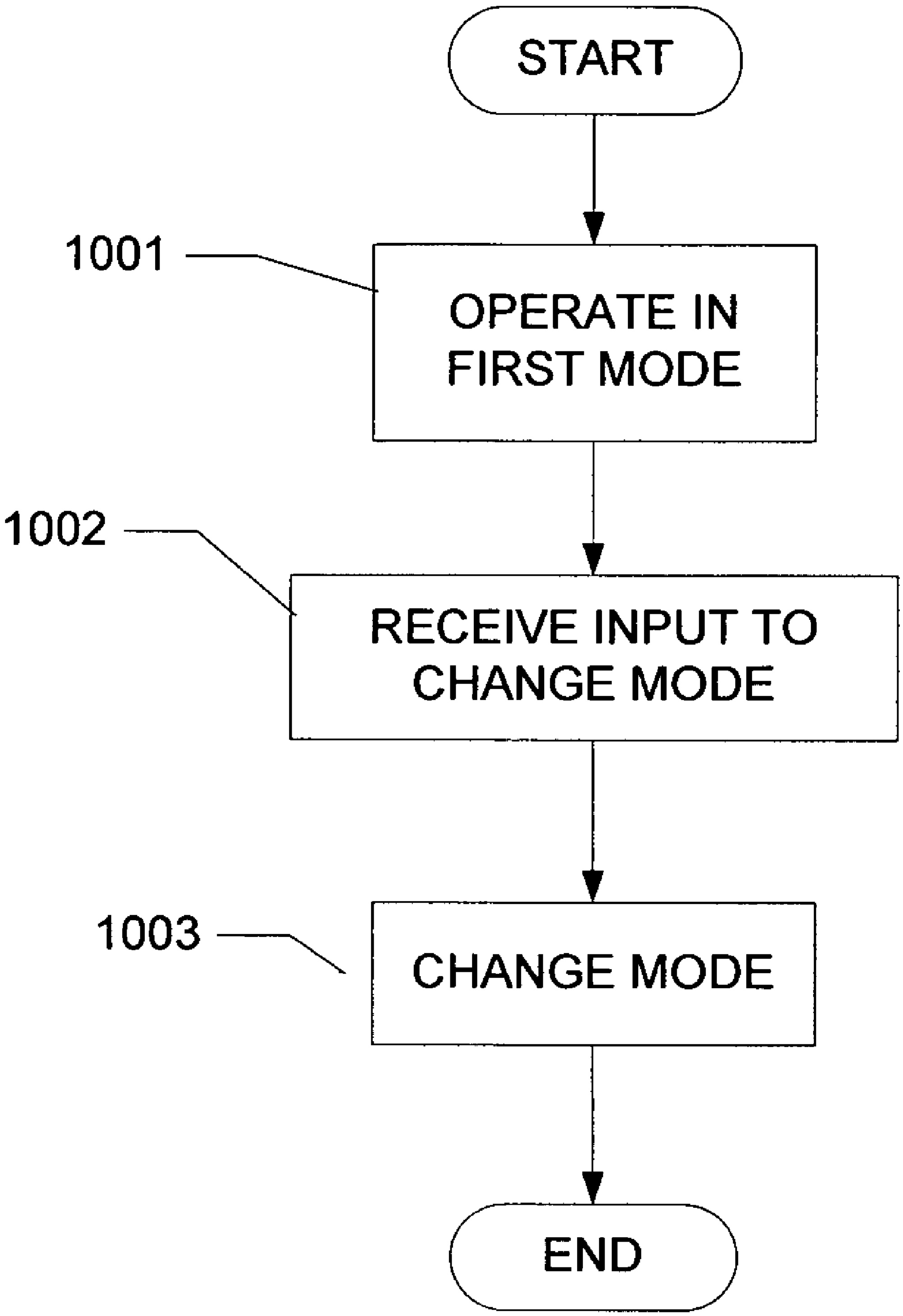
FIG. 10 is a flow diagram of a process using an expandable headset.

FIG. 10 illustrates an example process using various features described herein. For example, in step 1001, the headset may operate in a first mode. The first mode may be a monaural mode, such as during a telephone call. Headset 903 and/or cell phone 901 may determine the current mode based on the number of audio channels available from the signal source, or based on whether the second speaker is extended from headset 903. In the first mode, the user may use headset 100 as with any other cellular phone headset, and may carry on a monaural telephone conversation.

In step 1002, the user may finish the call, and may decide to listen to music. The user may remove the earpiece 104 from the headset, and place earpiece 104 in his/her other ear. The headset may receive an input indicating that the mode is to be changed from monaural to binaural. The input may be in a variety of forms, such as by the automatic detection of the removal of earpiece 104. This automatic detection may be accomplished through a switch/contact element on the earpiece or headset, or by a switch detecting a position of roller 106. The input may also be made by pressing one or more buttons 701, 802, or by entering commands on the device 901 itself (e.g., via a PDA menu).

In some aspects where an additional headset 904 is used, the input may be made by bringing the headset 904 within proximity of the phone 901 or headset 903. For example, if the Bluetooth format is used, the headsets 903, 904 and/or cell phone 901 may, upon demand, periodically or continuously scan for the presence of other Bluetooth-capable devices. The phone 901 (or headset 903) may be configured to automatically enter stereo mode when the user's second headset 904 is brought near the first headset 903. Alternatively, the input may take the form of a command issued by the second headset 904, such as when a button 108 is pressed on the second headset 904 to mate with the first headset 903.

When the input is received, the system changes operation to the second mode, such as binaural mode, in step 1003. So, for example, the phone 901 may enter binaural mode, and begin sending a second audio stream wirelessly to the second headset 904.

Although the example described above goes from mono- to binaural mode, the same is applicable going from any mode to any different mode, such as stereo to mono, stereo to 5-channel "surround" audio, etc.

Figure 11:
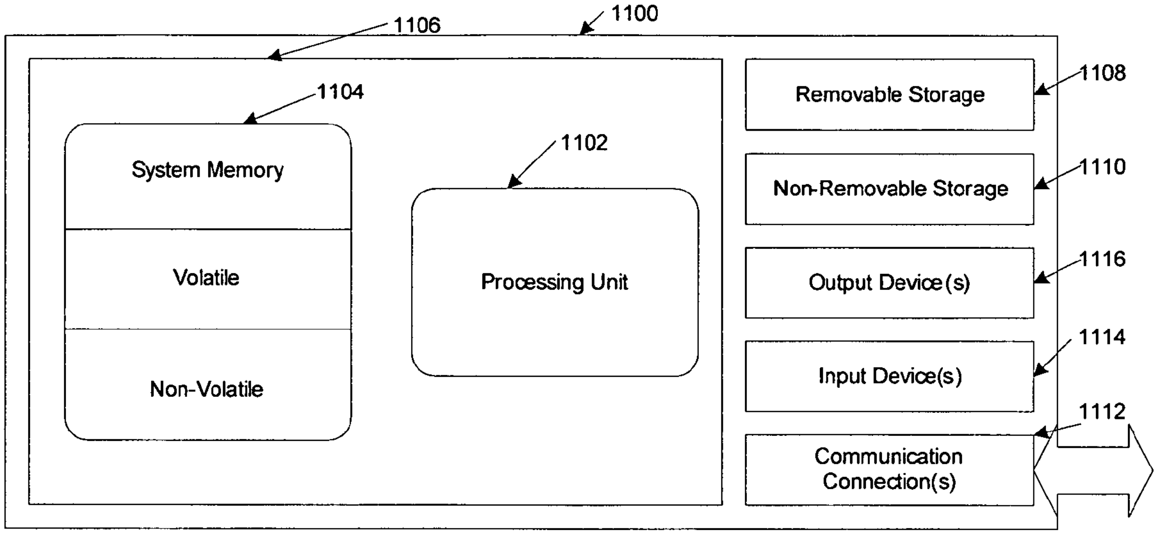
FIG. 11 is a block diagram of basic electrical components that may be used in the headset and/or the earpieces described herein.

With reference to FIG. 11, an exemplary system for implementing the headsets and/or earpieces described above may include a computing device, such as computing device 1100. In its most basic configuration, computing device 1100 typically includes at least one processing unit 1102 and memory 1104. Depending on the exact configuration and type of computing device, memory 1104 may be volatile (such as RAM), non-volatile (such as ROM, flash memory, etc.) or some combination of the two. This most basic configuration is illustrated in FIG. 11 by line 1106. Additionally, device 1100 may also have additional features/functionality. For example, device 1100 may also include additional storage (removable and/or non-removable), such as an SD memory card. Such additional storage is illustrated in FIG. 11 by removable storage 1108 and non-removable storage 1110. Computer storage media includes volatile and nonvolatile, removable and non-removable media implemented in any method or technology for storage of information such as computer readable instructions, data structures, program modules or other data. Memory 1104, removable storage 1108 and non-removable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 1100. Any such computer storage media may be part of device 1100, and any or all of the components described herein may comprise the circuitry in a headset and/or earpiece, including, but not limited to, hard-wired circuitry, firmware, software, etc., or any combination thereof.

Device 1100 may also contain communications connection(s) 1112 that allow the device to communicate with other devices. Communications connection(s) 1112 is an example of communication media, and may refer to the wired or wireless communications described above to allow the headsets to communicate with other headsets, earpieces, or other devices. These may include one or more antennas, transmission interfaces (e.g., Bluetooth processing), etc.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 1100 may also have human input device(s) 1114 such as buttons, mechanical and/or electrical switches, slide switches, etc. Output device(s) 1116 such as the primary speaker and the earpiece(s), and other devices such as displays, LEDs, etc.

If desired, headset 100 may be configured to operate with different types of devices, without requiring those devices to specially handle the user-configurable features of the headset described herein. For example, the headset 100 may be compatible with multiple different types of devices that use different numbers of audio channels. The user could use phone 901 and headset 903 for a monaural call, and when finished, the user could bring in second headset 904, and an MP3 player 905 as a separate device, and headsets 903, 904 would transfer their communications from phone 901 to the MP3 player. This transfer can be done by the user pressing one or more buttons on headset 903, 904, or by selecting an option on phone 901.

The headsets 903, 904 may support this functionality by including circuitry or a computer-executable program to accept any number of audio channels and to select one for generation of audio. So, when headset 903 is operating with a monaural cell phone 901, the headset 903 receives and plays one channel, but when the headset is switched over to use with a binaural MP3 player 905, or a multi-channel “surround” sound DVD player (not shown), the headset 903 can receive the separate audio channels and select one for play. The headset 903 may be programmed to transmit a second received audio channel to earpiece 104 for playing to the user’s other ear.

The ability to receive and process multiple audio channels in the headset may also allow the user to hear a monaural version of a stereo audio signal. For example, circuit 107 may include a mixer, or be programmed with a mixing function, to receive two audio channels and mix them into a single monaural signal for playing on the headset’s primary speaker. Then, as with the method in FIG. 10, the user may switch to stereo mode by bringing in another headset, or separating an earpiece 104 from the first headset, and the headset would cease mixing and begin transmitting the second audio channel to the second headset or earpiece.

Figure 12A:
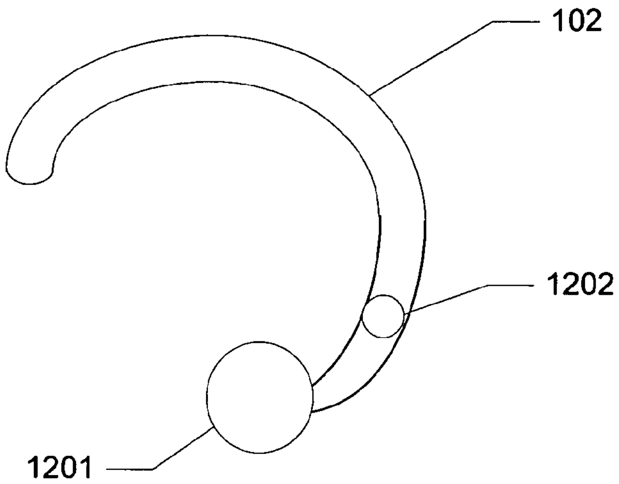
FIGS. 12*a* and 12*b* illustrate example features of a headset being switchable between ears.
Figure 12B:
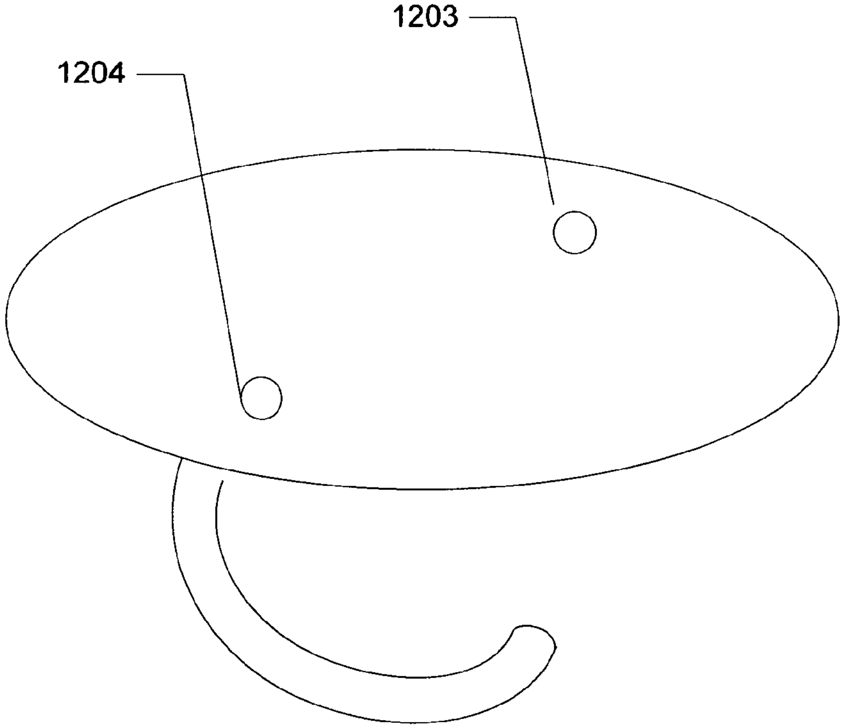

In some aspects, the headset may automatically detect the arrangement of the ear clasp 102 to determine whether the user is wearing the device in his/her left or right ear. This may be accomplished in a variety of ways, for example, using an electrical contact switch, a photosensitive switch, a contact switch to detect a person’s skin, a hardware setting, a software configuration setting, etc. FIGS. 12*a* and 12*b* illustrate an example. The ear clasp 102 may include a rotating connection 1201, allowing it to rotate about the headset between multiple positions (e.g., one with clasp 102 as shown, and one with clasp 102 downward, as shown in FIG. 12*b*. The opposition positions may allow the headset to be converted for wearing on a user’s left or right ear. One of switches 1203 and 1204 on the headset may make contact with a switch 1202 on the clasp 102, to detect the orientation that the clasp is in. As noted, other types of switches and contacts may be used. Such a device may also be configured to adjust an audio stream in accordance with the ear on which the device is worn. For example, if the user is wearing the headset on the right ear, the device may adjust a received stereo signal to route the right audio channel to the headset and the left audio channel to the earbud. Another example would be a user who has a different frequency response in each ear; the device could apply an equalizer function on each audio channel specific for each ear.

As an alternative option, the headset may forego the circuitry used to detect the change in modes (e.g., the removal of the earpiece 104), and may simply always operate in stereo mode. When the earpiece 104 is inserted in the body 101, it may continue to operate and play one audio channel for the stereo mode.

As an additional option, the headset may be programmed to store, such as in a memory, configuration parameters regarding an individual user’s audio preferences. These preferences may identify, for example, the number of channels the user prefers to hear, the distribution of channels to earpieces and speakers, the preferred volume settings for each individual speaker (e.g., different left and right volume levels if a person is more sensitive in one ear over the other), etc. Additionally, the headset may also store frequency response characteristics for the particular user as well. So, for example, if a user’s ears have poor detection of audio in a predetermined frequency range (e.g., a low frequency range, a high-pitch range, etc.), the headset and/or earpiece may automatically shift the frequency of the various audio channels sent to the earpieces to compensate for the user’s ears. So a user who has trouble hearing low frequencies may have his/her headset automatically shift the audio frequencies higher to improve the user’s ability to hear.

To configure these preferences and parameters, the headset may employ a configuration mode in which test tones are played to the various earpieces. For example, the headset may play a predetermined range of test tones (e.g., various notes on a scale), and ask the user to identify the preferred frequency range, or to identify tones that the user did not hear as well. The headset may begin at a low pitch and gradually increase the pitch until the user indicates he/she can hear, and may do the same from high pitch down, to ascertain the range of the user’s individual ear’s hearing. Alternatively, this information may be entered using an interface and buttons on the headset, or may be entered using a software application on a separate computing device, and uploaded onto the headset via wireless and/or wired interface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim the following:

1. A headset, comprising: a housing body; a first speaker connected to said housing body; an ear clasp connected to said housing body; a switch to detect an orientation of said clasp, wherein said headset is configured to adjust an audio signal provided to said first speaker based on said detected orientation of said clasp and wherein said clasp is attached to said housing body and configured to rotate between two positions.

2. The headset of claim 1, wherein said switch is a contact switch located on said housing body.

3. A headset method, comprising the steps of: detecting an ear on which a headset is worn by detecting an orientation of an ear clasp on said headset; adjusting an audio signal provided to a speaker on said headset in response to said detected orientation and wherein said step of detecting includes the step of detecting an electrical contact between a first switch element on said clasp and a second switch element on said housing body.

4. The method of claim 3, wherein said step of detecting includes the step of detecting a rotated position of said ear clasp.

5. The method of claim 3, wherein said step of adjusting is based on user preference information, and said method further comprises the step of storing sad user preference information in a memory.

6. The method of claim 5, wherein said step of changing further includes a step of adjusting a frequency of said audio signal, and said user preference information includes frequency characteristic data for a user of said headset.

7. The method of claim 6, further comprising the step of establishing said frequency characteristic for said user by playing test tones at different frequencies to said user, and receiving user response to said test tones.

8. The method of claim 5, further comprising the step of accepting user inputs on one or more buttons of said headset to enter said user preferences.

9. The method of claim 5, further comprising the step of uploading said user preferences to said headset from a computing device.

10. The method of claim 9, wherein said step of uploading is performed using a wireless interface on said headset.

11. The method of claim 3, wherein said step of adjusting further includes changing said audio signal between left and right speaker audio signals.

12. The method of claim 11, wherein said step of changing further includes a step of adjusting a volume of said audio signal.

13. A headset method, comprising the steps of: using one or more test tones to establish user audio characteristics; automatically detecting whether a headset is worn on a user's right or left ear; automatically adjusting an audio signal provided by said headset based on the user audio characteristics and on the ear on which said headset is worn and wherein said step of automatically detecting detects a position of a rotatable clasp connected to said headset.

14. The method of claim 13, wherein said test tones are played by a speaker on said headset.

15. The method of claim 13, wherein said step of automatically detecting is based on a state of an electrical contact switch.

16. The method of claim 13, wherein said step of automatically adjusting further comprises the step of changing said audio signal between right and left audio signals.

17. The method of claim 13, wherein said step of automatically adjusting further comprises the step of shifting a frequency of said audio signal.

* * * * *